United States Patent [19]

Inui et al.

[11] Patent Number: 5,191,003

[45] Date of Patent: Mar. 2, 1993

[54] RUBBER COMPOSITION

[75] Inventors: Naoki Inui, Yamatokoriyama; Chinehito Ebina, Minoo; Miyuki Oikawa, Ibaraki; Hideo Nagasaki, Osaka; Shinichi Yachigo, Toyonaka; Manji Sasaki, Nishinomiya, all of Japan

[73] Assignee: Sumitomo Chemical Company, Limited, Osaka, Japan

[21] Appl. No.: 741,617

[22] Filed: Aug. 7, 1991

[30] Foreign Application Priority Data

Aug. 8, 1990 [JP] Japan .................................. 2-210603
Mar. 7, 1991 [JP] Japan .................................... 3-41652

[51] Int. Cl.$^5$ ............................................... C08K 5/20
[52] U.S. Cl. ................................. 524/206; 524/209; 524/217; 524/218; 524/219; 524/220; 524/222; 524/225; 524/226; 152/564
[58] Field of Search ................ 152/564; 524/206, 209, 524/217, 219, 220, 222, 225, 226, 928, 925, 496, 218

[56] References Cited

U.S. PATENT DOCUMENTS

| | | | |
|---|---|---|---|
| 2,302,819 | 11/1944 | Vaala | 524/222 |
| 3,034,879 | 5/1962 | Spacht | 524/222 |
| 3,522,205 | 7/1970 | Gobran et al. | 524/206 |
| 4,538,531 | 9/1985 | Wong | 111/1 |
| 4,642,322 | 2/1987 | Wehner et al. | 524/217 |
| 4,663,375 | 5/1987 | Tamura | 524/219 |
| 4,894,404 | 1/1990 | Minnick | 524/226 |

FOREIGN PATENT DOCUMENTS 2911467 2/1980 Fed. Rep. of Germany .
70539 3/1989 Japan .

OTHER PUBLICATIONS

Ben Kastein: "A Historical View; Carbon Black in Tire Treads", *Rubber World*, 187, 44-46.
A. S. Kuzminsky: "The Mechanisms . . . Elastomers", *Developments in Polymer Stabilization*-4, 71-109 (1981).
World Patents Index abstract of JP-A-1 070 539 Mar. 16, 1989 (AN 89-125527).

*Primary Examiner*—Veronica P. Hoke
*Attorney, Agent, or Firm*—Wenderoth, Lind & Ponack

[57] ABSTRACT

A rubber composition comprising a rubber, a filler and a diamide compound represented by the formula:

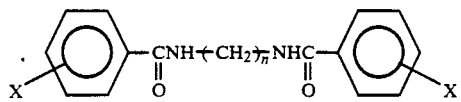

wherein X is hydrogen, alkyl of 1 to 18 carbon atoms, alkoxy of 1 to 18 carbon atoms, alkanoyl of 2 to 19 total carbon atoms, amino, nitro, cyano, hydroxy, carboxy or halogen, and n is an integer of 2 to 12. This rubber composition is increased in its loss factor and is useful for tires and rubber vibration isolators. For example, the resulting tires prepared from the rubber composition are improved in their gripping performance.

18 Claims, No Drawings

RUBBER COMPOSITION

BACKGROUND OF THE INVENTION

1. Field of the Invention

This invention relates to a rubber composition. More particularly, it relates to a rubber composition having an increased loss factor (tan δ) without impairing the mechanical strength.

2. Description of the Related Art

In recent years, the progress in high-performance automobiles, the extension of paved roads and the growth of superhighway networks have increased the demand to improve the gripping performance of tires, which performance has a close relation to acceleration capability and braking capability of automobiles. It is known that a high gripping performance can be achieved if the energy loss due to the friction between a tire tread and a road surface is increased. Because of this, there have been desired tread rubber materials which have an increased loss factor (tan δ) upon defomation.

It has also been desired to improve the damping capacity and the vibration-insulation property of damping materials, in particular, rubber vibration isolators for use in automobiles and home electrical appliances, so as to attain improved comfortableness and quietness. The properties required for rubber vibration isolators are:

(1) to have a hardness higher than a certain level because of necessity for carrying huge static loads;

(2) to have a low vibration transmissibility, more specifically to have a high loss factor (tan δ) for vibration in a low frequency region, namely during idling and low speed driving, and at the same time to have a low dynamic-to-static modulus ratio (dynamic modulus of elasticity/static modulus of elasticity) for noise and vibration in a high frequency region, namely during high speed driving; and (3) to be excellent in resistance to flexural fatigue and durability against external force repeatedly applied for a prolonged period of time.

It is also important that the static fatigue resistance, such as compression set, is not inferior to that of ordinary rubbers.

Among hitherto known techniques for increasing the loss factor (tan δ) upon deformation are included the one in which a styrene-butadiene copolymer rubber having a high styrene content is used as a base, the one in which a large quantity of process oil is incorporated, and the one in which a highly reinforceable carbon black is added in a large quantity. In Japanese Patent Kokai (Laid-open) No. 70,539/89, it is disclosed to improve the loss factor of a rubber by blending the rubber with a (meth)acryloyl-containing p-phenylenediamine derivative, such as N-methacryloyl-N'-phenyl-p-phenylenediamine.

However, the use of a styrene-butadiene copolymer rubber having a high styrene content is still insufficient, though it shows some improvement in the loss factor. The addition of a large quantity of process oil or highly reinforceable carbon black can improve the loss factor, but it brings about an increase in heat build-up of the rubber to deteriorate the strength characteristics and abrasion resistance of the rubber, and also brings about significant increase in a dynamic-to-static modulus ratio. The use of the (meth)acryloyl-containing p-phenylenediamine derivative disclosed in Japanese Patent Kokai (Laid Open) No. 70,539/89 can increase the loss factor of the rubber, but it has become clear to have a drawback in that the strength characteristics of the resulting rubber compositions tend to be deteriorated.

SUMMARY OF THE INVENTION

In view of the above, the present inventors have conducted intensive investigations to develop a rubber composition having a sufficiently high loss factor (tan δ) which, when used in a tire, enables to attain an improved gripping performance, especially at elevated temperatures and, when used as a rubber vibration isolator, exhibits an excellent vibration-insulating property, without significant deterioration in the mechanical strength of the rubber. This invention has been accomplished as a result of the investigations.

There is provided by this invention a rubber composition comprising a rubber, a filler and a diamide compound represented by the following formula (I):

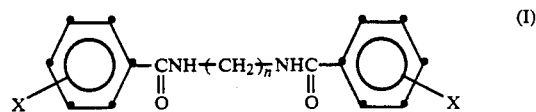

wherein X is hydrogen, alkyl of 1 to 18 carbon atoms, alkoxy of 1 to 18 carbon atoms, alkanoyl of 2 to 19 total carbon atoms, amino, nitro, cyano, hydroxy, carboxyl or halogen, and n is an integer of 2 to 12.

This invention also provides a method for increasing the loss factor of a rubber without substantial lowering in mechanical strength and increase in dynamic-to-static modulus ratio, which method comprises blending the rubber with a filler and a diamide compound represented by the above formula (I).

DESCRIPTION OF THE PREFERRED EMBODIMENTS

The diamide compound represented by formula (I) can be prepared, for example, by subjecting a corresponding diamine to a dehydrohalogenation reaction with an acid chloride in an inert solvent, such as toluene, chloroform or the like, in the presence of a basic compound, such as triethylamine, pyridine, sodium hydroxide or the like.

Examples of the alkyl denoted by X in formula (I) include methyl, ethyl, propyl, butyl, pentyl, hexyl, octyl, decyl, dodecyl, tetradecyl, hexadecyl, octadecyl, and the like. Examples of the alkoxy denoted by X include methoxy, ethoxy, propoxy, butoxy, pentyloxy, hexyloxy, octyloxy, decyloxy, dodecyloxy, tetradecyloxy, hexadecyloxy, octadecyloxy, and the like. Examples of the alkanoyl denoted by X include acetyl, propionyl, butyryl, valeryl, pivaloyl, hexanoyl, octanoyl, decanoyl, lauroyl, myristoyl, palmitoyl, stearoyl, and the like. Of these alkyl, alkoxy and alkanoyl groups, those containing 3 or more carbon atoms in their alkyl moieties may be branched. Of the alkyl, alkoxy and alkanoyl groups, those containing a relatively small number of carbon atoms, in particular, those containing up to 4 carbon atoms in their alkyl moieties are preferable.

The amino denoted by X may be unsubstituted, mono-substituted or di-substituted. Examples of such amino groups include unsubstituted amino, methylamino, ethylamino, dimethylamino, diethylamino, and the like. Examples of the halogen denoted by X include fluroine, chlorine and bromine. When X is other than hydrogen, the group may be positioned at any of the o-, m- or p-positions of the benzene rings (against the position of the amide group). Of the compounds having such substituents, o- or m-substituted derivatives are preferred. It is particularly preferable to use a compound in which X is hydrogen.

As described hereinabove, n in formula (I) is an integer of 2 to 12. It is preferable to use a compound in which n is an integer of 5 to 9, in particular, an integer of 6 or 8.

Representative diamide compounds of formula (I) which may be used in this invention are as follows, but they are given for illustration and not for limitation.

(1) N,N'-Dibenzoylethylenediamine
(2) N,N'-Dibenzoyl-1,3-propanediamine
(3) N,N'-Dibenzoyl-1,5-pentanediamine
(4) N,N'-Dibenzoyl-1,6-hexanediamine
(5) N,N'-Dibenzoyl-1,7-heptanediamine
(6) N,N'-Dibenzoyl-1,8-octanediamine
(7) N,N'-Dibenzoyl-1,9-nonanediamine
(8) N,N'-Dibenzoyl-1,10-decanediamine
(9) N,N'-Dibenzoyl-1,12-dodecanediamine
(10) N,N'-Bis(2-methylbenzoyl)-1,6-hexanediamine
(11) N,N'-Bis(3-methylbenzoyl)-1,6-hexanediamine
(12) N,N'-Bis(4-methylbenzoyl)-1,6-hexanediamine
(13) N,N'-Bis(4-t-butylbenzoyl)-1,6-hexanediamine
(14) N,N'-Bis(4-methoxybenzoyl)-1,6-hexanediamine
(15) N,N'-Bis(2-bromobenzoyl)-1,6-hexanediamine
(16) N,N'-Bis(3-bromobenzoyl)-1,6-hexanediamine
(17) N,N'-Bis(4-bromobenzoyl)-1,6-hexanediamine
(18) N,N'-Bis(2-chlorobenzoyl)-1,6-hexanediamine
(19) N,N'-Bis(3-chlorobenzoyl)-1,6-hexanediamine
(20) N,N'-Bis(4-chlorobenzoyl)-1,6-hexanediamine
(21) N,N'-Bis(2-chlorobenzoyl)-1,8-octanediamine
(22) N,N'-Bis(3-chlorobenzoyl)-1,8-octanediamine
(23) N,N'-Bis(2-bromobenzoyl)-1,8-octanediamine
(24) N,N'-Bis(3-methoxybenzoyl)-1,6-hexanediamine
(25) N,N'-Bis[3-(dimethylamino)benzoyl]-1,6-hexanediamine
(26) N,N'-Bis(2-nitrobenzoyl)-1,6-hexanediamine
(27) N,N'-Bis(3-nitrobenzoyl)-1,6-hexanediamine
(28) N,N'-Bis(2-cyanobenzoyl)-1,6-hexanediamine
(29) N,N'-Bis(2-hydroxybenzoyl)-1,6-hexanediamine
(30) N,N'-Bis(3-carboxybenzoyl)-1,6-hexanediamine
(31) N,N'-Bis(2-ethoxybenzoyl)-1,8-octanediamine
(32) N,N'-Bis(3-ethoxybenzoyl)-1,8-octanediamine
(33) N,N'-Bis(3-ethylbenzoyl)-1,8-octanediamine
(34) N,N'-Bis[4-(1,1,3,3-tetramethylbutyl)benzoyl]-1,6-hexanediamine
(35) N,N'-Bis(4-dodecylbenzoyl)-1,6-hexanediamine
(36) N,N'-Bis(3-hexyloxybenzoyl)-1,6-hexanediamine
(37) N,N'-Bis(4-pivaloylbenzoyl)-1,6-hexanediamine
(38) N,N'-Bis(4-nonanoylbenzoyl)-1,6-hexanediamine The diamide compounds of formula (I) can be used in any form. For example, the compounds can be added to a rubber individually or in the form of a mixture of two or more of them. It is also possible to use a mixture of one or more of them with a carrier, such as clay, which does not adversely affect the properties of the rubber. The compounds can be added at any stage in the production of compounded rubbers.

There are no particular restrictions on the quantity of the diamide compounds of formula (I) to be used upon the compounding of rubber. It is however preferable to use the compounds in an amount of from about 0.1 to about 20 parts by weight, more preferably from about 1 to about 10 parts by weight, per 100 parts by weight of the rubber.

In general, the compounding of various compounding ingredients into a synthetic or natural rubber is carried out at a temperature not higher than 200° C., to prevent the rubber from an oxidative deterioration. In this invention, too, the compounding of the diamide compounds is preferably carried out at a temperature not higher than 200° C., in particular, at a temperature between 140° and 200° C. The vulcanization of rubber is carried out in general at a temperature not higher than 200° C. In this invention, the vulcanization or curing is preferably carried out at a temperature between 140° and 200° C., more preferably between 170° and 200° C.

In this invention, there can be used any fillers employed in the rubber industry. It is generally preferred to use carbon black as the filler. There is no particular restriction on the kinds of carbon black to be used in this invention, and any carbon black which have hitherto been used in the rubber industry can be employed in this invention. For example, highly reinforceable carbon black having a nitrogen absorption specific surface area of 80 to 250 $m^2/g$, such as SAF black, ISAF black, HAF black, etc., have hitherto been used in order to improve the gripping performance of tires. In this invention, too, such highly reinforceable carbon black can be used with advantage for tire rubbers. In the case of rubber vibration isolators, the use of HAF black, FF black, FEF black, GPF black, SRF black, FT black or the like is preferred. There are no particular restrictions on the amount of the filler to be compounded. It is however generally preferred to use the filler in an amount of from about 20 to about 200 parts by weight, per 100 parts by weight of the rubber.

Examples of the rubber usable in this invention include natural rubbers; synthetic rubbers, such as polyisoprene rubber (IR), styrene-butadiene copolymer rubber (SBR), polybutadiene rubber (BR), acrylonitrile-butadiene copolymer rubber (NBR), isoprene-isobutylene copolymer rubber (IIR) and ethylene-propylene-diene copolymer rubber (EPDM); blends of natural and synthetic rubbers; and blends of synthetic rubbers, such as blends of SBR and IR, and blends of SBR and BR.

Recently, SBR having a high styrene content, in particular, has been preferably used in order to improve the gripping performance of tires. In this invention, too, the use of such SBR having a high styrene content is advantageous. This invention is effective for SBR having a styrene content of 20 to 50% by weight. In this case, there can be obtained rubber compositions highly suited for tires. The base rubber for tires may, of course, be a polymer blend mainly composed of such SBR. It is possible to use SBR either of the type produced by solution polymerization or of the type produced by emulsion polymerization. In the case where the rubber composition of this invention is to be employed as a rubber vibration isolator, the use of a natural rubber or a polymer blend mainly composed of a natural rubber is preferred.

Upon compounding of tire tread rubber materials, process oils have frequently been used in order to improve the gripping performance of tires. In this invention, too, the use of a process oil is admissible and advantageous. There are no particular restrictions on the amount of the process oil to be blended. In general, the process oil is used in an amount not more than 200 parts by weight, preferably in an amount of from 5 to 200 parts by weight, per 100 parts by weight of the rubber. There is no particular restriction on the kinds of the process oil to be used, and any process oil which has hitherto been employed in the rubber industry can be used also in this invention.

It is a matter of course that various other chemicals which have hitherto been employed in the rubber industry can also be used in this invention, including, e.g., antioxidants, vulcanizing agents, vulcanization accelerators, retarders, peptizers, softeners and the like.

This invention will further be explained in detail by way of examples in which rubbers are blended with compounds of the above formula (I) to evaluate their properties. It would however be understood that the invention is by no means limited by the examples. In the following examples, % and parts are based on the weight unless otherwise specifically noted.

The following is a list of diamide compounds and a p-phenylenediamine derivative used in the examples and comparative examples, together with symbols designated thereto.

A: N,N'-Dibenzoyl-1,3-propanediamine
B: N,N'-Dibenzoyl-1,4-butanediamine
C: N,N'-Dibenzoyl-1,6-hexanediamine
D: N,N'-Dibenzoyl-1,8-octanediamine
E: N,N'-Dibenzoyl-1,10-decanediamine
F: N,N'-Dibenzoyl-1,12-dodecanediamine
G: N,N'-Bis(2-methylbenzoyl)-1,6-hexanediamine
H: N,N'-Bis(3-methylbenzoyl)-1,6-hexanediamine
I: N,N'-Bis(2-chlorobenzoyl)-1,8-octanediamine black, stearic acid, process oil and zinc oxide were charged into a 250 ml Bumbury's mixer (Laboplastomill manufactured by Toyo Seiki Co.) maintained at an oil bath temperature of 170° C., and the mixture was kneaded for 5 minutes at a mixer revolution of 50 rpm. During the kneading, the temperature of the contents was 160°–170° C. The resultant rubber blend was transferred to an open mill, and thereto was added the vulcanization accelerator and sulfur shown in the above formulation at a temperature of 40°–50° C. followed by kneading. The kneaded mixture was vulcanized and shaped into a predetermined form in a vulcanizing press at 170° C., and the shaped vulcanized product was subjected to the following tests.

Tan $\delta$ was determined at temperatures in the range of from $-50°$ to $100°$ C. under conditions of an initial static strain of 10% and a frequency of 10 Hz, using a viscoelasticity spectrometer manufactured by Iwamoto Seisakusho Co. The dynamic-to-static modulus ratio was determined according to JIS K 6385. The modulus at room temperature ($M_{100}$, $M_{300}$ and $M_{500}$) was determined by subjecting a test piece (Dumbbell No. 3 according to JIS K 6301) prepared from the above rubber composition to a tensile test.

Of the test results obtained, tan $\delta$ at 80° C., dynamic-to-static modulus ratio at 25° C. and $M_{100}$, $M_{300}$ and $M_{500}$ at room temperature are shown in Table 1.

TABLE 1

| | The Invention | | | | | | | | | | | | | | | | Comparison | |
|---|---|---|---|---|---|---|---|---|---|---|---|---|---|---|---|---|---|---|
| Run No. | 1 | 2 | 3 | 4 | 5 | 6 | 7 | 8 | 9 | 10 | 11 | 12 | 13 | 14 | 15 | 16 | C1 | C2 |
| Compounds | | | | | | | | | | | | | | | | | | |
| Kinds | A | B | C | D | E | F | G | H | I | J | K | L | M | N | O | P | — | Sx |
| Amount Added (parts) | 5 | 5 | 5 | 5 | 5 | 5 | 5 | 5 | 5 | 5 | 5 | 5 | 5 | 5 | 5 | 5 | — | 5 |
| Test Results | | | | | | | | | | | | | | | | | | |
| tan $\delta$ (80° C.) | 0.360 | 0.390 | 0.423 | 0.430 | 0.358 | 0.357 | 0.387 | 0.398 | 0.412 | 0.419 | 0.402 | 0.382 | 0.355 | 0.400 | 0.360 | 0.362 | 0.335 | 0.370 |
| Dynamic-to-static Modulus Ratio | 2.30 | 2.18 | 2.02 | 2.03 | 2.20 | 2.15 | 2.16 | 2.11 | 2.05 | 2.07 | 2.11 | 2.15 | 2.18 | 2.08 | 2.21 | 2.19 | 2.34 | 2.14 |
| $M_{100}$ (kg/cm$^2$) | 16 | 16 | 17 | 15 | 15 | 15 | 15 | 15 | 16 | 16 | 15 | 15 | 15 | 16 | 15 | 15 | 15 | 13 |
| $M_{300}$ (kg/cm$^2$) | 67 | 68 | 70 | 65 | 66 | 67 | 69 | 68 | 69 | 70 | 68 | 69 | 70 | 69 | 68 | 69 | 68 | 43 |
| $M_{500}$ (kg/cm$^2$) | 142 | 140 | 144 | 136 | 136 | 138 | 144 | 143 | 140 | 139 | 142 | 144 | 141 | 139 | 145 | 140 | 142 | 90 |

J: N,N'-Bis(3-chlorobenzoyl)-1,8-octanediamine
K: N,N'-Bis(2-bromobenzoyl)-1,8-octanediamine
L: N,N'-Bis(4-t-butylbenzoyl)-1,6-hexanediamine
M: N,N'-Bis(4-dodecylbenzoyl)-1,6-hexanediamine
N: N,N'-Bis(3-ethoxybenzoyl)-1,8-octanediamine
O: N,N'-Bis(4-hexyloxybenzoyl)-1,6-hexanediamine
P: N,N'-Bis(4-pivaloylbenzoyl)-1,6-hexanediamine
Sx: N-Methacryloyl-N'-phenyl-p-phenylenediamine

EXAMPLE 1

| [Compounding Formulation] | parts |
|---|---|
| Styrene-butadiene copolymer rubber (a) prepared by emulsion polymerization (having a styrene content of 35% and containing 37.5 parts of aromatic oil, per 100 parts of rubber) | 137.5 |
| ISAF carbon black | 80 |
| Stearic acid | 3 |
| Zinc oxide | 5 |
| Aromatic process oil | 12.5 |
| Vulcanization accelerator (N-Cyclohexyl-2-benzothiazole sulfenamide) | 1 |
| Sulfur | 2 |
| Compound | Shown in Table 1 |

In accordance with the above formulation, the rubber, one of the compounds shown in Table 1, the carbon

EXAMPLE 2

| [Compounding Formulation] | parts |
|---|---|
| Styrene-butadiene copolymer rubber (b) prepared by emulsion polymerization (styrene content of 23.5%) | 100 |
| ISAF carbon black | 45 |
| Stearic acid | 3 |
| Zinc oxide | 5 |
| Vulcanization accelerator (N-cyclohexyl-2-benzothiazole sulfenamide) | 1 |
| Sulfur | 2 |
| Compound | Shown in Table 2 |

The procedure of Example 1 was repeated, except that the formulation was changed as above. Results obtained are shown in Table 2. In this case, however, it was not possible to determine $M_{500}$ since the test pieces were broken before reaching an elongation percentage of 500%.

TABLE 2

| Run No. | | The Invention | | Comparison | |
|---|---|---|---|---|---|
| | | 17 | 18 | C3 | C4 |
| Compounds | Kinds | C | D | — | Sx |
| | Amount Added (parts) | 5 | 5 | — | 5 |
| Test Results | tan δ (80° C.) | 0.211 | 0.213 | 0.152 | 0.199 |
| | Dynamic-to-static Modulus Ratio | 1.59 | 1.62 | 1.65 | 1.66 |
| | $M_{100}$ (kg/cm$^2$) | 31 | 32 | 29 | 28 |
| | $M_{300}$ (kg/cm$^2$) | 153 | 156 | 154 | 113 |
| | $M_{500}$ (kg/cm$^2$) | — | — | — | — |

EXAMPLE 3

| [Compounding Formulation] | parts |
|---|---|
| Styrene-butadiene copolymer rubber (c) prepared by solution polymerization (having a styrene content of 40% and containing 40 parts of aromatic oil, per 100 parts of rubber) | 140 |
| Carbon black | Shown in Table 3 |
| Stearic acid | 3 |
| Zinc oxide | 5 |
| Aromatic process oil | 50 |
| Vulcanization accelerator (N-cyclohexyl-2-benzothiazole sulfenamide) | 1 |
| Sulfur | 2 |
| Compound | Shown in Table 3 |

The procedure of Example 1 was repeated, except that the formulation was changed as above. Results obtained are shown in Table 3.

TABLE 3

| Run No. | | The Invention | | | | Comparison | | | |
|---|---|---|---|---|---|---|---|---|---|
| | | 19 | 20 | 21 | 22 | C5 | C6 | C7 | C8 |
| Carbon Black | Kinds | ISAF | ISAF | SAF | SAF | ISAF | ISAF | SAF | SAF |
| | Amount Added (parts) | 100 | 100 | 100 | 100 | 100 | 100 | 100 | 100 |
| Compounds | Kinds | C | D | C | D | — | Sx | — | Sx |
| | Amount Added (parts) | 6 | 6 | 6 | 6 | — | 6 | — | 6 |
| Test Results | tan δ (80° C.) | 0.278 | 0.283 | 0.318 | 0.323 | 0.232 | 0.255 | 0.265 | 0.292 |
| | Dynamic-to-static Modulus Ratio | 2.03 | 2.01 | 2.08 | 2.05 | 2.29 | 2.32 | 2.15 | 2.11 |
| | $M_{100}$ (kg/cm$^2$) | 9 | 9 | 11 | 11 | 9 | 7 | 10 | 7 |
| | $M_{300}$ (kg/cm$^2$) | 28 | 29 | 31 | 32 | 26 | 19 | 28 | 20 |
| | $M_{500}$ (kg/cm$^2$) | 63 | 64 | 66 | 67 | 60 | 45 | 63 | 46 |

EXAMPLE 4

| [Compounding Formulation] | parts |
|---|---|
| Butadiene rubber (JSR BR01) | 100 |
| ISAF carbon black | 75 |
| Stearic acid | 3 |
| Zinc oxide | 5 |
| Vulcanization accelerator (N-cyclohexyl-2-benzothiazole sulfenamide) | 1 |
| Sulfur | 2 |
| Compound | Shown in Table 4 |

The procedure of Example 1 was repeated, except that the formulation was changed as above. Results obtained are shown in Table 4. In this case, however, it was not possible to determine $M_{300}$ and $M_{500}$ since the test pieces were broken before reaching an elongation percentage of 300%.

TABLE 4

| Run No. | | The Invention | | Comparison | |
|---|---|---|---|---|---|
| | | 23 | 24 | C9 | C10 |
| Compounds | Kinds | C | D | — | Sx |
| | Amount Added (parts) | 5 | 5 | — | 5 |
| Test Results | tan δ (80° C.) | 0.251 | 0.270 | 0.165 | 0.215 |
| | Dynamic-to-static Modulus Ratio | 2.64 | 2.65 | 2.71 | 3.49 |
| | $M_{100}$ (kg/cm$^2$) | 46 | 47 | 45 | 43 |
| | $M_{300}$ (kg/cm$^2$) | — | — | — | — |
| | $M_{500}$ (kg/cm$^2$) | — | — | — | — |

| [Compounding Formulation] | parts |
|---|---|
| Natural rubber | 100 |
| Carbon black | Shown in Table 5 |
| Stearic acid | 3 |
| Zinc oxide | 5 |
| Vulcanization accelerator (N-cyclohexyl-2-benzothiazole sulfenamide) | 1 |
| Sulfur | 2 |
| Compound | Shown in Table 5 |

EXAMPLE 5

The procedure of Example 1 was repeated, except that the formulation was changed as above and that tan δ was determined under conditions of an initial static load of 100 g and a frequency of 10 Hz. Results obtained are shown in Table 5. In this case, however, it was not possible to determine $M_{500}$ since the test pieces were broken before reaching an elongation percentage of 500%.

TABLE 5

| Run No. | | The Invention | | | | Comparison | | | |
|---|---|---|---|---|---|---|---|---|---|
| | | 25 | 26 | 27 | 28 | C11 | C12 | C13 | C14 |
| Carbon Black | Kinds | ISAF | ISAF | FEF | FEF | ISAF | ISAF | FEF | FEF |
| | Amount Added (parts) | 75 | 75 | 45 | 45 | 75 | 75 | 45 | 45 |
| Compounds | Kinds | C | D | C | D | — | Sx | — | Sx |
| | Amount Added (parts) | 5 | 5 | 5 | 5 | — | 5 | — | 5 |
| Test Results | tan δ (80° C.) | 0.234 | 0.248 | 0.170 | 0.177 | 0.146 | 0.200 | 0.110 | 0.143 |
| | Dynamic-to-static Modulus Ratio | 1.42 | 1.39 | 1.21 | 1.19 | 1.43 | 1.37 | 1.25 | 1.22 |
| | $M_{100}$ (kg/cm$^2$) | 38 | 38 | 35 | 36 | 36 | 31 | 35 | 31 |

TABLE 5-continued

| Run No. | The Invention | | | | Comparison | | | |
|---|---|---|---|---|---|---|---|---|
| | 25 | 26 | 27 | 28 | C11 | C12 | C13 | C14 |
| $M_{300}$ (kg/cm$^2$) | 168 | 163 | 168 | 167 | 165 | 149 | 162 | 141 |
| $M_{500}$ (kg/cm$^2$) | — | — | — | — | — | — | — | — |

EXAMPLE 6

| [Compounding Formulation] | parts |
|---|---|
| Styrene-butadiene copolymer rubber (a) prepared by emulsion polymerization (having a styrene content of 35% and containing 37.5 parts of aromatic oil, per 100 parts of rubber) | 70 |
| Natural rubber | 30 |
| ISAF carbon black | 80 |
| Stearic acid | 3 |
| Zinc oxide | 5 |
| Aromatic process oil | 10 |
| Vulcanization accelerator (N-cyclohexyl-2-benzothiazole sulfenamide) | 1 |
| Sulfur | 2 |
| Compound | Shown in Table 6 |

The procedure of Example 1 was repeated, except that the formulation was changed as above, Results obtained are shown in Table 6.

TABLE 6

| | | The Invention | | Comparison | |
|---|---|---|---|---|---|
| Run No. | | 29 | 30 | C15 | C16 |
| Compounds | Kinds | C | D | — | Sx |
| | Amount Added (parts) | 5 | 5 | — | 5 |
| Test Results | tan δ (80° C.) | 0.365 | 0.393 | 0.281 | 0.331 |
| | Dynamic-to-static Modulus Ratio | 1.89 | 1.84 | 1.98 | 1.86 |
| | $M_{100}$ (kg/cm$^2$) | 25 | 26 | 23 | 21 |
| | $M_{300}$ (kg/cm$^2$) | 95 | 91 | 93 | 80 |
| | $M_{500}$ (kg/cm$^2$) | 198 | 194 | 198 | 145 |

EXAMPLE 7

| [Compounding Formulation] | parts |
|---|---|
| Styrene-butadiene copolymer rubber (a) prepared by emulsion polymerization (having a styrene content of 35% and containing 37.5 parts of aromatic oil, per 100 parts of rubber) | 50 |
| Butadiene rubber (JSR BR01) | 50 |
| ISAF carbon black | 80 |
| Stearic acid | 3 |
| Zinc oxide | 5 |
| Aromatic process oil | 10 |
| Vulcanization accelerator (N-cyclohexyl-2-benzothiazole sulfenamide) | 1 |
| Sulfur | 2 |
| Compound | Shown in Table 7 |

The procedure of Example 1 was repeated, except that the formulation was changed as above. Results obtained are shown in Table 7. In this case, too, it was not possible to determine $M_{500}$ since the test pieces were broken before reaching an elongation percentage of 500%.

TABLE 7

| | | The Invention | | Comparison | |
|---|---|---|---|---|---|
| Run No. | | 31 | 32 | C17 | C18 |
| Compounds | Kinds | C | D | — | Sx |
| | Amount Added (parts) | 5 | 5 | — | 5 |
| Test Results | tan δ (80° C.) | 0.363 | 0.389 | 0.259 | 0.319 |
| | Dynamic-to-static Modulus Ratio | 2.41 | 2.43 | 2.45 | 2.62 |
| | $M_{100}$ (kg/cm$^2$) | 42 | 43 | 40 | 36 |
| | $M_{300}$ (kg/cm$^2$) | 139 | 135 | 137 | 122 |
| | $M_{500}$ (kg/cm$^2$) | — | — | — | — |

The rubber composition blended with the particular diamide compound according to the present invention is effectively increased in tan δ at an elevated temperature region above 60° C., which tan δ corresponds to gripping power when tires reach higher temperatures. Further, the composition exhibits substantially no deterioration in its strength characteristics. Accordingly, the rubber composition of the present invention can provide tires excellent in their gripping performance which is closely related to the accelerating capability and braking capability of automobiles, when the composition is applied to tires, in particular, to a tread part of the tires. Alternatively, the rubber composition of the present invention can provide rubber vibration isolators having excellent performance, particurlarly in positions requiring a vibration-insulation property at a high temperature region, for example, in an engine room of automobiles.

What is claimed is:

1. A rubber compositon comprising a rubber selected from the group consisting of natural rubbers and synthetic rubbers containing at least one diene monomer, and per 100 parts by weight of the rubber, from about 20 to about 200 parts by weight of carbon black and from about 0.1 to about 20 parts by weight of a diamide compound represented by the formula:

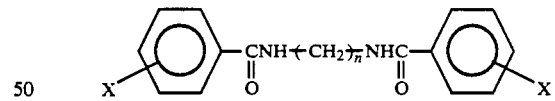

wherein X is hydrogen, alkyl of 1 to 18 carbon atoms, alkoxy of 1 to 18 carbon atoms, alkanoyl of 2 to 19 total carbon atoms, amino, nitro, cyano, carboxy or halogen, and n is an integer of 2 to 12.

2. The rubber composition according to claim 1, wherein n in the formula of said diamide compound is an integer of 5 to 9.

3. The rubber composition according to claim 2, wherein n is 6 or 8.

4. The rubber composition according to claim 1, wherein the diamide compound is represented by the formula in which X is hydrogen and n is 6 or 8.

5. The rubber composition according to claim 1, wherein the diamide compound is represented by the formula in which X is other than hydrogen and is attached to an o- or m-position of the benzene ring against the position of the amide group, and n is 6 or 8.

6. The rubber composition according to claim 1, wherein the diamide compound is present in an amount of 1.0 to 10 parts by weight, per 100 parts by weight of the rubber.

7. The rubber composition according to claim 1, which is used for tires and wherein said carbon black has a nitrogen absorption specific surface area of 80 to 250 m²/g.

8. The rubber composition according to claim 1, which is used for rubber vibration isolators and wherein said carbon black is HAF black, FF black, FEF black, GPF black, SRF black or FT black.

9. The rubber composition according to claim 1, wherein the rubber is a natural rubber, a synthetic rubber selected from polyisoprene rubber, styrene-butadiene copolymer rubber, polybutadiene rubber, acrylonitrile-butadiene copolymer rubber, isoprene-isobutylene copolymer rubber and ethylene-propylenediene copolymer rubber, a blend of a natural rubber and a synthetic rubber, or a blend of synthetic rubber.

10. The rubber composition according to claim 9, which is used for tires and wherein said rubber is styrene-butadiene copolymer rubber having a styrene content of 20 to 50% by weight or a polymer blend mainly composed of the styrene-butadiene copolymer rubber.

11. The rubber composition according to claim 9, which is used for rubber vibration isolators and wherein said rubber is a natural rubber or a polymer blend mainly composed of the natural rubber.

12. The rubber composition according to claim 1, which further comprises a process oil.

13. A method for increasing a loss factor of a rubber which comprises blending the rubber with carbon black and a diamide compound represented by the formula:

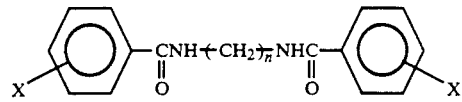

wherein X is hydrogen, alkyl of 1 to 18 carbon atoms, alkoxy of 1 to 18 carbon atoms, alkanoyl of 2 to 19 total carbon atoms, amino, nitro, cyano, carboxy or halogen, wherein n is an integer of 2 to 12, wherein the rubber is selected from the group consisting of natural rubbers and synthetic rubbers containing at least one diene monomer, wherein the carbon black is used in an amount of from about 20 to about 200 parts by weight, and wherein the diamide compound is used in an amount of from about 0.1 to about 20 parts by weight, each per 100 parts by weight of the rubber.

14. The method according to claim 13, wherein the diamide compound is incorporated into the rubber at a temperature of 140° to 200° C., and the thus blended rubber is cured at a temperature of 140° to 200° C.

15. A tire prepared from the composition of claim 1.

16. A rubber vibration isolator prepared from the composition of claim 1.

17. The rubber composition according to claim 1, wherein X in the formula of said diamide compound is hydrogen or halogen attached to an o- or m-position of the benzene ring against the position of the amide group.

18. The rubber composition according to claim 17, wherein n in the formula of said diamide compound is 6 or 8.

* * * * *